United States Patent
Stephen et al.

(10) Patent No.: US 6,318,356 B1
(45) Date of Patent: Nov. 20, 2001

(54) ASH DISPOSAL AND DAMPING MEANS FOR BARBECUE GRILL

(75) Inventors: Robert T. Stephen; Erich J. Schlosser, both of Barrington, IL (US)

(73) Assignee: Weber-Stephen Products Co., Palatine, IL (US)

( * ) Notice: Subject to any disclaimer, the term of this patent is extended or adjusted under 35 U.S.C. 154(b) by 0 days.

(21) Appl. No.: 09/374,421

(22) Filed: Aug. 13, 1999

(51) Int. Cl.$^7$ .................................. A47J 37/00; F23J 1/00
(52) U.S. Cl. ........................ 126/25 R; 126/242; 126/245
(58) Field of Search ................... 126/242, 9 B, 126/25 R, 9 R, 182, 245, 159, 285 R; 16/DIG. 41, 441, DIG. 40; 403/254, 255, 256, 247, 167; 15/145

(56) References Cited

U.S. PATENT DOCUMENTS

| | | |
|---|---|---|
| Re. 33,091 | 10/1989 | Schlosser . |
| 101,177 | 3/1870 | Stevenson . |
| D. 351,308 | 10/1994 | Pai . |
| 1,562,396 * | 11/1925 | Ward ...................... 403/247 |
| 1,617,557 * | 2/1927 | Weatherhead, Jr. ............ 16/DIG. 41 |
| 2,740,395 | 4/1956 | Goodwin . |
| 3,126,881 | 3/1964 | Blotsky, Jr. . |
| 3,202,436 * | 8/1965 | Barreca ................. 403/256 |
| 3,209,743 | 10/1965 | Stewart et al. . |
| 3,300,237 * | 1/1967 | Rolen ..................... 403/256 |
| 3,485,520 * | 12/1969 | Alexander ............... 15/145 |
| 3,638,814 * | 2/1972 | Lowery .................. 403/167 |
| 4,142,809 * | 3/1979 | Shell .................... 403/255 |
| 4,281,633 * | 8/1981 | Wackerman .............. 126/25 R |
| 4,416,248 | 11/1983 | Schlosser . |
| 4,567,876 | 2/1986 | Ogden . |
| 4,576,140 | 3/1986 | Schlosser . |
| 4,603,679 | 8/1986 | Ogden . |
| 4,705,423 * | 11/1987 | Smith ................... 403/254 |
| 4,879,990 | 11/1989 | Clark . |
| 5,016,607 | 5/1991 | Doolittle et al. . |
| 5,027,788 | 7/1991 | Schlosser et al. . |
| 5,036,832 | 8/1991 | Schlosser et al. . |
| 5,213,075 | 5/1993 | Stephen et al. . |
| 5,299,553 | 4/1994 | Giebel et al. . |
| 5,385,420 * | 1/1995 | Newman, Sr. et al. ............ 15/145 |
| 5,458,428 * | 10/1995 | West .................... 403/256 |
| 5,584,098 * | 12/1996 | Koyama et al. ........... 16/DIG. 24 |
| 5,887,314 * | 3/1999 | Jordan, Jr. .............. 16/DIG. 41 |
| 5,942,261 * | 8/1999 | Dreith .................. 15/145 |

FOREIGN PATENT DOCUMENTS 2 417 964    9/1979   (FR) .

* cited by examiner

Primary Examiner—James C. Yeung
(74) Attorney, Agent, or Firm—Wallenstein & Wagner, Ltd.

(57) ABSTRACT

A barbecue grill is claimed. The barbecue grill comprises a grill housing, a damper means, and an elongated handle. The grill housing has a bottom which extends around a vertical axis and an ash disposal opening positioned along its bottom. The damper means is for covering the ash disposal opening. The damper means includes a drive hub assembly rotatable about the vertical axis and has at least one damper body extending therefrom. The bottom of the grill housing has an aperture aligned with the vertical axis. The hub assembly is received into the aperture with an end portion of the hub assembly positioned below the bottom. The end portion includes a linearly aligned passageway having an entry keyhole. The elongated handle is positioned below the bottom of the grill housing. The handle has a proximal end and a distal end. The proximal end is adapted to be received through the entry keyhole into the passageway wherein a portion of the proximal end frictionally engages the hub assembly to fixedly secure the elongated handle within the passageway.

33 Claims, 3 Drawing Sheets

ASH DISPOSAL AND DAMPING MEANS FOR BARBECUE GRILL

TECHNICAL FIELD

The present invention relates generally to barbecue grills and, more particularly, to an ash disposal and damping means for grills that burn carbon-based fuels.

BACKGROUND

Barbecue grills are very widely used today. One popular type of barbecue grill is referred to as a kettle-type grill. A barbecue kettle may consist of a generally semi-spherical bottom bowl that has a circular opening with a cooking grid located slightly below the upper rim of the bowl. A generally semi-spherical top cover can be placed on the bottom bowl to enclose the barbecue kettle. The barbecue kettle is supported on a leg arrangement. This kettle configuration is a registered trademark of the Assignee of the present invention.

Presently, one of the most popular barbecue grills is marketed by the Assignee of the present invention. One type of these barbecue grills that has received very favorable acceptance by consumers is disclosed in U.S. Reissue Pat. No. 33,091, owned by the Assignee of the present invention, and is sold under the trademark ONE-TOUCH®.

Barbecue kettles that are designed for burning charcoal or some other carbon-based product as a fuel generally have a second or lower grid for supporting the charcoal below the cooking grid. Additionally, both the bottom bowl and top cover generally have vent openings. The vent openings provide the interior of the kettle grill with the necessary oxygen for combustion of the charcoal while the cover is located on the bottom bowl.

During operation, the charcoal on the second grid burns, turns to ash, and falls to the bottom of the bowl. Additionally, grease, cooking fat, pieces of the food being cooked, portions of hot coals and other things also might fall to the bottom of the bowl. A plurality of openings are commonly located at the bottom of the bowl to allow this material to be discharged out of the bowl. Often, these openings are also employed as the vent openings for allowing air into the kettle for combustion of the charcoal fuel. As the ash from the burned fuel falls from the second grid, however, it may accumulate in the bottom of the bowl. A successful apparatus for scraping and disposing of this ash and debris from the bottom of the kettle through the openings, and for controlling the air intake into the bottom of the kettle is disclosed in U.S. Reissue Pat. No. 33,091 ("the '091 patent").

The scraping and disposing means disclosed the '091 patent includes a disc mounted immediately above the center of the bottom for rotation about a vertical axis and has three arms secured thereto. The handle is positioned below the bottom of the grill and secured to the disc. The arms are generally triangular in cross-section and have distal edges fitting closely to the bottom. In one position, the arms cover the bowl openings, but may be rotated back and forth to push ash along the bottom of the bowl to the openings where it will fall out. The disc, arms and handle are designed to be assembled without using any tools. However, to assemble the scraping and disposal means described in the '091 patent a separate releaseable retaining means is provided. Thus, the scraping and disposal means is often difficult to assemble and costly to manufacture.

Accordingly, there is a need for an improved scraping and disposing means that is easily assembled, does not require a separate retaining means, and does not require tools to assemble while at the same time is less costly to manufacture.

SUMMARY OF THE INVENTION

The barbecue grill of the present invention includes an ash disposal and damping means for disposing of ash which accumulates at the bottom of the barbecue grill and for venting the barbecue grill with oxygen as it burns combustible fuel. The present assembly is extremely easy to assemble and connect to a barbecue grill. Further, the present assembly can be easily disassembled to clean and repair. The barbecue grill comprises a grill housing, a damper means, and an elongated handle interconnected to the damper means.

The grill housing includes a bottom generally centered about a vertical axis. An ash disposal opening is positioned along the bottom of the barbecue grill. The bottom of the grill includes an aperture which is in alignment with the vertical axis.

The damper means may selectively cover the ash disposal opening. The damper means includes a drive hub assembly which is rotatable about the vertical axis. The drive hub is adapted for covering the ash disposal opening. The damper means includes a drive hub assembly rotatable about the vertical axis. A damper body is connected to the drive hub assembly and extends outwardly therefrom.

The drive hub assembly is received into the aperture located at the bottom of the barbecue grill. An end portion of the hub assembly is positioned below the bottom of the barbecue grill. The end portion includes an opening which defines a passageway.

An elongated handle is positioned below the bottom. The elongated handle has a proximal end and a distal end. The proximal end is adapted to be received into the passageway of the end portion of the hub assembly. The handle engages the hub assembly and is frictionally secured to the hub assembly.

Other features and advantages of the invention will be apparent from the following specification taken in conjunction with the following drawings.

BRIEF DESCRIPTION OF THE DRAWINGS

FIG. 3b is a cross-sectional view of an ash disposal and damping means of the present invention, sectioned generally transverse to FIG. 3a;

DETAILED DESCRIPTION

Figure 1:
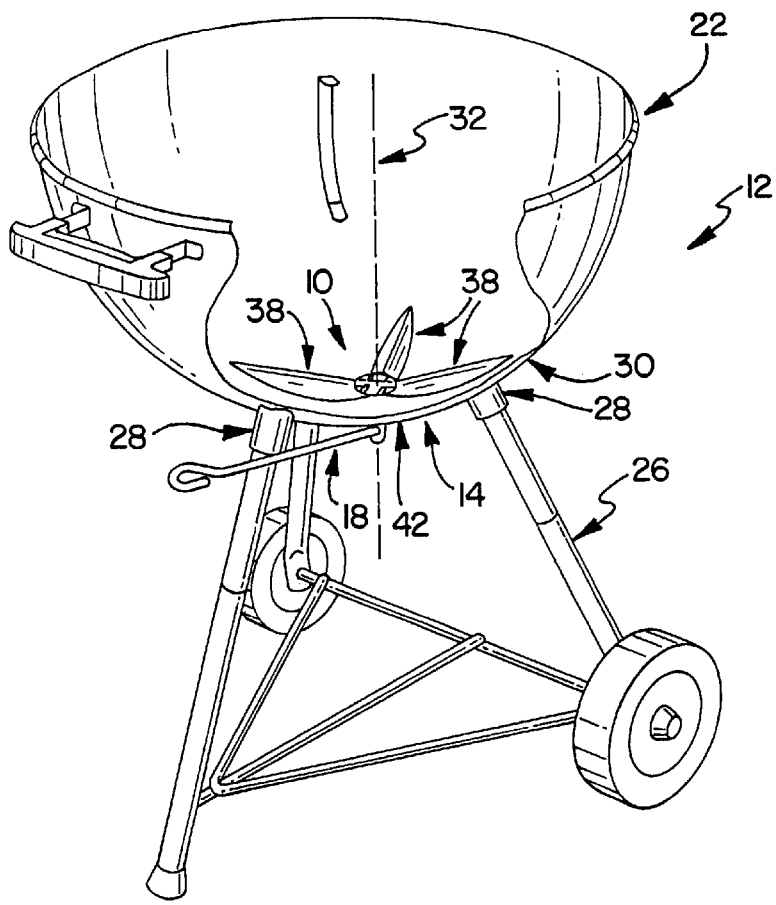
FIG. 1 is a perspective view of a barbecue grill with a ash disposal and damping means of the present invention.

While this invention is susceptible of embodiments in many different forms, there is shown in the drawings and will herein be described in detail a preferred embodiment of the invention with the understanding that the present disclosure is to be considered an exemplification of the principles of the invention and is not intended to limit the broad aspect of the invention to the embodiment illustrated.

Referring to FIG. 1, an ash disposal and damping means 10 of the present invention is illustrated in combination with a prior art barbecue grill 12. It should be understood that the damping means 10 described herein can be used with any barbecue grill and is not limited to the particular barbecue grill 12 illustrated. The ash disposal and damping means 10 comprises a damper means 14 and an elongated handle 18. The ash disposal and damping means 10 can be used to remove unwanted ash from the bottom of a barbecue grill and can be used to vent the barbecue grill with oxygen to improve the cooking performance of the barbecue grill.

The barbecue grill 12 illustrated in FIG. 1 is generally constructed in accordance with the teachings of U.S. Reissue Pat. No. 33,091 ("the '091 patent"), assigned to Weber-Stephen Products Co. The '091 patent is hereby incorporated by reference. The grill 12 comprises a grill housing 22 and a frame 26 for supporting the grill 12. The grill housing 22 may have a plurality of frame receivers 28 positioned on a bottom portion 30 of the grill housing 22. The bottom portion 30 extends around a vertical axis 32.

A lower grate (not shown) is place within the grill housing 22 and spaced a short distance above the bottom portion 30 of the grill housing 22 to hold the solid carbon-based fuel (such as charcoal briquettes), which are burned in the barbecuing process. The ash may be created from other carbon-based items, such as paper, from a paper-start device. A cooking grid (not shown) on which the food being cooked is placed is spaced above the lower grate and below the grill housing's 22 upper rim.

Figure 2:
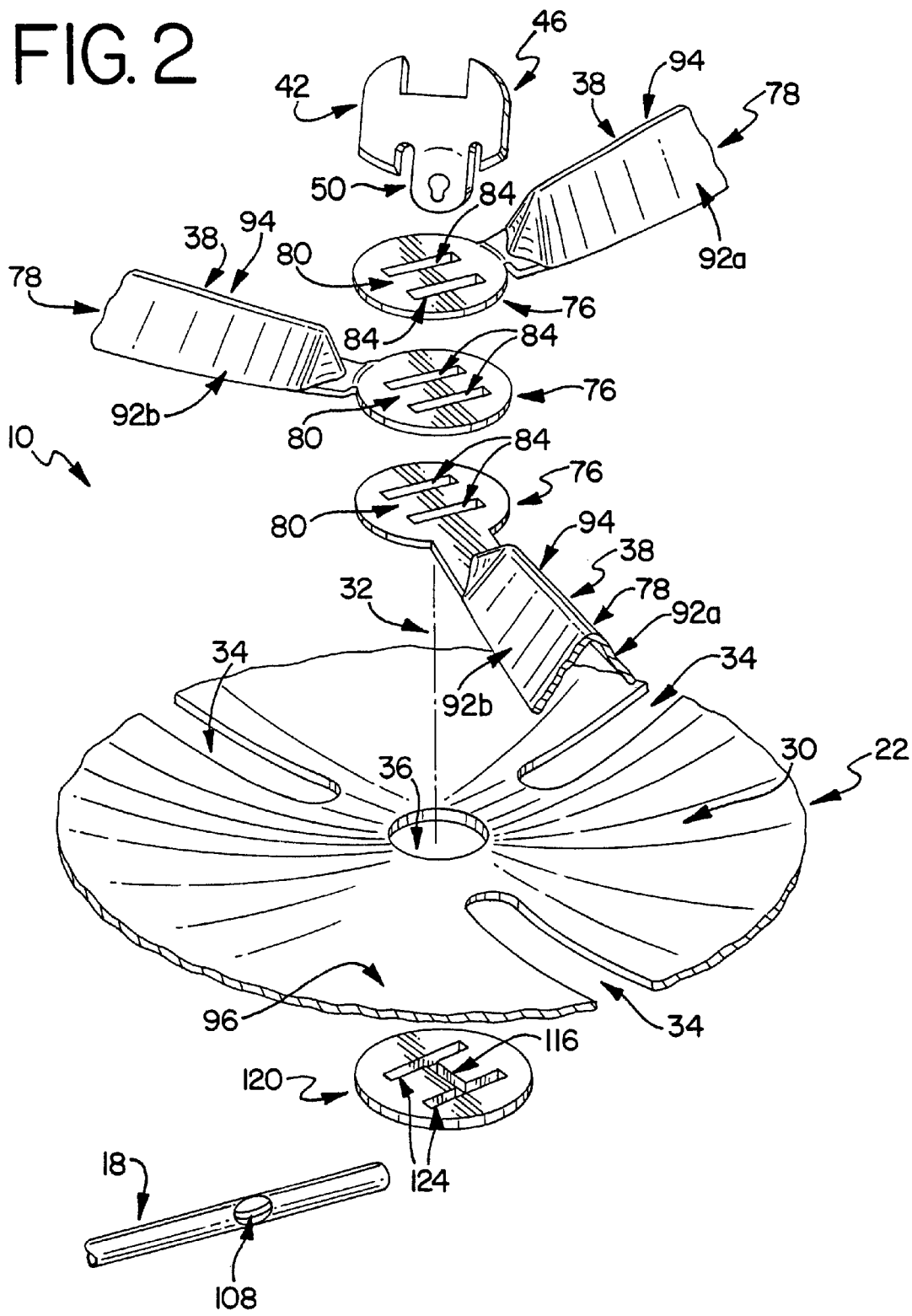
FIG. 2 is an exploded view of an ash disposal and damping means of the present invention.

Now referring to FIG. 2, the bottom portion 30 of the grill housing 22 includes at least one plurality of opening 34, preferably having a plurality of openings 34. During the cooking process, the fuel within the grill housing 22 burns and turns to ash which can, if left alone, collect on the bottom 30 of the grill housing 22. The ash can be drained through one or more of the openings 34. In the preferred embodiment shown, there are three openings 34 in the bottom 30 of the grill housing 22.

The bottom portion also includes an aperture 36. The aperture 36 is generally aligned with the vertical axis 3 and preferably located in a position generally between the openings 34.

The damper means 14 comprises a damper body 38 which extends from a drive hub assembly 42. The hub assembly 42 is provided to rotate the damper body 38 to selectively cover and uncover the openings 34 in the bottom 30 of the grill housing 22. The damper body 38 is used to vent the openings 34 during cooking, scrape the bottom 30 of the grill housing 22 of the fallen ash and debris, and direct the ash towards the openings 34 after cooking in order to clean the bottom 30 of the grill housing 22. Accordingly, the number of damper bodies 38 will generally equal the number of openings 34 in the bottom 30 of the grill housing 22. In the embodiment illustrated, there are three damper bodies 38. Alternatively, the damper body may be formed of one body having openings that are dimensioned and spaced to selectively mate with the openings 34 of the grill 12.

The hub assembly 42 includes an enlarged upper portion 46 and an end portion 50. The end portion 50 of the hub assembly 42 extends downwardly through the aperture 36 so that a part of the end portion 50 is positioned below the bottom 30 of the grill housing 22. The aperture 36 is positioned so that the hub assembly 42 is journaled therein for rotation about the vertical axis 32.

Figure 4A:
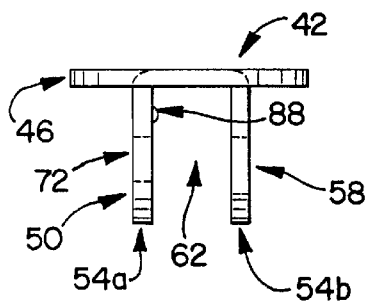
FIG. 4a is front view of a hub assembly of the present invention.
Figure 4B:
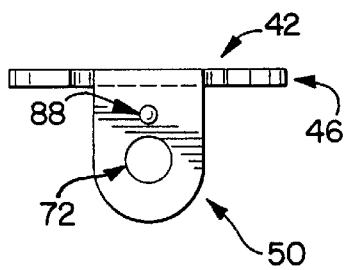
FIG. 4b is a side view of a hub assembly of the present invention.
Figure 4C:
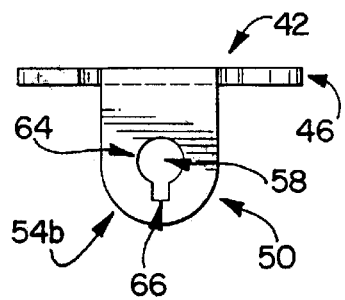
FIG. 4c is an opposing side view of a hub assembly of the present invention.

Referring to FIGS. 4a–c, the end portion 50 comprises a pair of legs 54a,b which extend downwardly from the upper portion 46. One of the legs 54b includes an entry keyhole 58 which opens into a passageway 62 between the legs 54a,b. Preferably, the entry keyhole 58 has an arcuately shaped portion 64 with a slotted portion 66 extending therefrom. The opposing leg 54a includes a rounded exit keyhole 72. Alternatively shaped configurations of the entry keyhole 58 and the exit keyhole 72 are contemplated, without departing from this aspect of the invention. The purpose of the entry and exit keyholes 58, 72 will become clear upon further description.

Figure 3A:
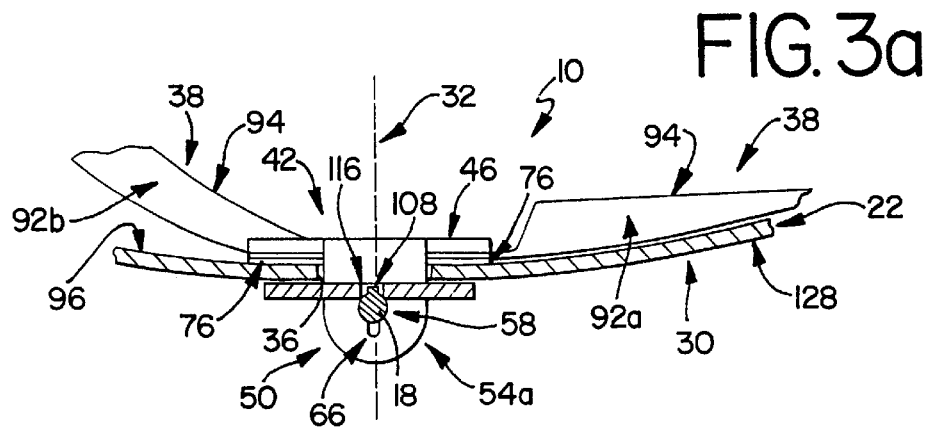
FIG. 3a is a cross-sectional view of an ash disposal and damping means of the present invention.
Figure 3B:
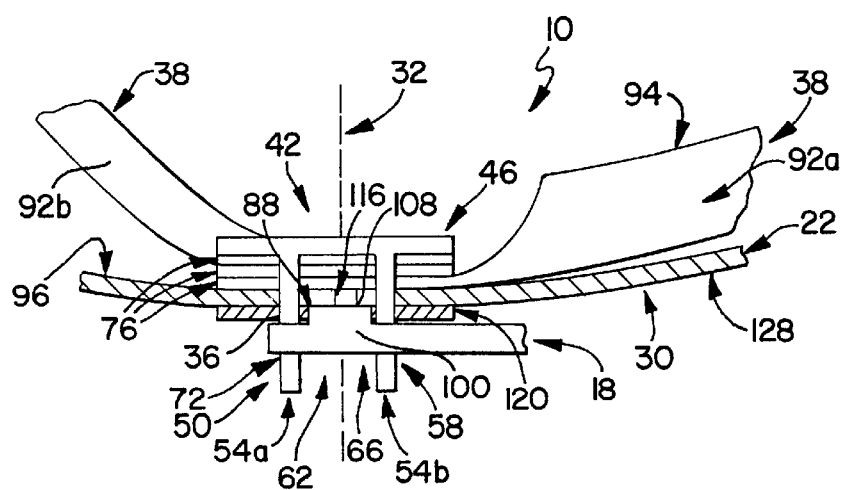

Referring to FIGS. 2, 3a, and 3b, the damper bodies 38 are joined to the hub assembly 42 and extend outwardly therefrom. Accordingly, the damper bodies 38 have enlarged fastening ends 76 preferably in the form of washers. Free ends 78 extend radially outwardly from the fastening ends 76. Each fastening end 76 has at least one opening, preferably having a pair of openings as a pair of slits 80. The slits 80 are adapted to press fit around the opposing legs 54a,b. The slits 80 include a gripping surface 84 for frictionally engaging the legs 54a,b and provide a frictional force of sufficient magnitude to pre-assemble and retain the damper bodies 38 on the hub assembly 42 prior to assembly of the grill.

Alternatively or additionally, the legs 54a,b can be provided with a boss 88 (see FIGS. 4a and 4b) for pre-assembling and retaining the damper bodies 38 on the hub assembly 42 prior to assembly of the grill. By pre-assembling the damper bodies 38 with the hub assembly 42 assembly of the grill is simplified and thus, facilitated. Pre-assembly can be performed either by the endure or at the factory. No additional fastening means are needed to secure the damper bodies 38 to the hub assembly 42. In this arrangement, the slits 80 of the damper body 38 fit onto the hub assembly 42 past the boss 88 by forced fit. The damper body 38 is then retained on the hub assembly 42 by blockage of the boss 88.

The free ends 78 extend from the fastening ends 76 at predetermined positioning angles to the slits 80. Each free end 78 is generally triangular or an inverted V-shape in transverse cross-section resulting in two side faces 92a,b which slope outwardly and downwardly from an upper spline 94. Thus, when the free ends 78 are in registry with the openings 34, each free end 78 will envelope an upper surface 96 of the bottom 30 about the opening 34 thereby blocking the movement of air through the opening 34 to the interior of the grill housing 22, thus acting as an adjustable damper.

The damper means components are generally purchased unassembled with instructions for assembly. In this respect, the respective damper bodies 38 are numbered consecutively to indicate which damper body 38 is to be sequentially placed over legs 54a,b. This is necessary since there are different offsets between the fastening ends 76 and the lower edges of the respective free ends 78 to insure that they are in close contact with the inner surface 96 of the bottom 30. The configuration of the slits 80 in combination of alignment with the legs 54a,b of the hub assembly 42 is an improvement over prior art damper means and increases the probability that the three damper bodies 38 will be spaced apart by 120 degrees and thus, be concurrently alignable with the openings 34 in the bottom 30 of the grill housing 22.

The damper bodies 38 may also be integral with the hub assembly 42. For example, the damper bodies 38 can be stamped projections radiating outwardly from the hub assembly 42. The damper bodies can also be press fit, welded, bonded, or joined in any manner to the hub assembly 42 without departing from the spirit of this invention.

Once the damper bodies 38 have been assembled on the hub assembly 42, the end portion 50 is inserted through the aperture 36 so that the entry and exit keyholes 58, 72 are positioned below the bottom 30 of the grill housing 22 in horizontal alignment. The elongated handle 18 is then attached to the hub assembly 42 below the bottom 30 of the grill housing 22. As will be described in detail, the handle 18 is attached to the hub assembly 42 without the use of additional fasteners and tools.

Figure 5:
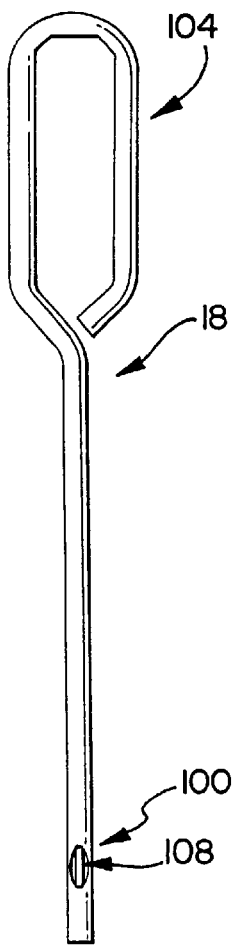
FIG. 5 is a side view of a handle of the present invention.
Figure 6:
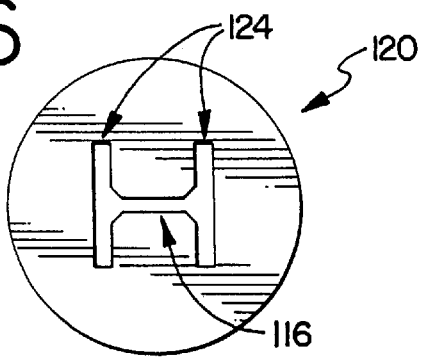
FIG. 6 is a top view of a retaining member of the present invention.

The handle 18 has proximal and distal ends 100, 104 (see FIG. 5). The proximal end 100 is adapted to be fully inserted into the entry keyhole 58, through the passageway 62, and partially inserted into the exit keyhole 72. Portions of the proximal end 100 remain positioned within the entry keyhole 58, the passageway 62, and the exit keyhole 72 when the handle 18 is attached to the hub assembly 42.

The proximal end 100 of the handle 18 includes a coupling member such as a radial projection 108. The radial projection 108 is spaced from the end of the handle 18. In cross-section, the radial projection 108 has a shape that is similar to the slotted portion 66 of the entry keyhole 58. Thus, the radial projection 108 is adapted to pass through the entry keyhole 58 and into the passageway 62, however the radial projection 108 cannot be passed through the exit keyhole 72 due to the differing shapes of the exit keyhole 72 and the entry keyhole 58. Once within the passageway 62, the radial projection 108 is rotated so that it engages a portion of the hub assembly 42. The frictional force or fitted blocking structural arrangement between the hub assembly 42 and the radial projection 108 attaches and fixes the handle 18 to the hub assembly 42.

The hub assembly 42 may also include a mating receiver 116 for accepting the radial projection 108. The mating receiver 116 and the slotted portion 66 of the entry keyhole 58 are positioned at an angle to each other. This forces the person assembling the grill 12 to rotate the handle 18 once it is inserted into the passageway 62 in order for the radial projection 108 to be received within the mating receiver 116 and thus reliably attach the handle 18 to the hub assembly 42 without the use of an additional fastener or any tools.

In the preferred embodiment, the mating receiver 116 is located on a retaining member 120. The retaining member 120 is a washer-like disc. Accordingly, the retaining member 120 has voids 124 for receiving the legs 54a,b of the hub assembly 42. The voids 124 are in communication with the mating receiver 116 to form an H-shaped hole in the middle of the retaining member 120. In use, the retaining member 120 is placed over and around the legs 54a,b so that the retaining member 120 is positioned adjacent an outer surface 128 of the bottom 30 of the grill housing 22.

To assemble the handle 18 with the hub assembly 42, the proximal end 100 of the handle 18 is inserted into the passageway 62, and the radial projection 108 is positioned within the passageway 62. The handle 18 is then rotated. As the handle 18 is rotated the radial projection 108 contacts the retaining member 120. The retaining member 120 is forced upwardly towards the outer surface 128 of the bottom 30 of the grill housing 22. As the radial projection 108 comes into contact with the mating receiver 116, the retaining member 120 drops downwardly onto the portion of the proximal end 100 of the handle 18 within the passageway 62, the radial projection 108 is positioned within the mating receiver 116, and the handle 18 is reliably attached to the hub assembly 42. The fit of the voids 124 of the retaining member 120 about the legs 54a,b prevents the retaining member 120 from excessive movement and/or rotational movement about the end portion 50 of the hub assembly 42.

The attachment method disclosed herein combines a radial projection 108 located on the handle 18 in communication with a mating receiver 116 located on the hub assembly 42. However, it should be understood that the location of these components is merely a design choice, and their respective locations can be varied or reversed without departing from the spirit of the disclosed invention.

Further, the damper body 38 and the hub assembly 42 may be optionally formed of a single segment of sheet stock, such that the end portion 50 is formed by bending a portion of the sheet stock downward to pass through the aperture 36. The present invention thereby provides a means for securing the damper body 38 to the bottom by a retaining assembly comprised of a retaining member 120 with a receiver 116 being engaged with a projection 108 on a proximal end 108 of a member 18 that passes through the end portion 50.

While a specific embodiment has been illustrated and described, numerous modifications are possible without departing from the spirit of the invention, and the scope of protection is only limited by the scope of the accompanying claims.

What is claimed is:

1. A barbecue grill comprising:
    a grill housing having a bottom extending around a vertical axis and having an ash disposal opening positioned along the bottom;
    damper means for covering the ash disposal opening, the damper means including a drive hub assembly rotatable about the vertical axis and having at least one damper body extending therefrom, the bottom having an aperture aligned with the vertical axis and the hub assembly being received into the aperture with an end portion of the hub assembly being positioned below the bottom, the end portion having an opening defining a passageway; and
    an elongated handle below the bottom having a proximal end and a distal end, the proximal end having a radial projection, the proximal end received in the passageway wherein the radial projection frictionally engages with a mating receiver of the hub assembly to secure the elongated handle to the hub assembly without an additional fastening.

2. The barbecue grill of claim 1 wherein the radial projection is spaced from an end of the elongated handle, the projection being received into a mating receiver channel located within the mating receiver to retain a portion of the proximal end within the hub assembly.

3. The barbecue grill of claim 1 wherein the hub assembly comprises a retaining washer placed over the end portion of the hub assembly and adjacent an outer wall of the bottom, the retaining washer having a mating receiver for accepting the radial projection of the proximal end of the elongated handle.

4. The barbecue grill of claim 1 wherein the end portion of the hub assembly comprises first and second opposing legs, the passageway passing through the first leg and having a keyhole adapted for receiving the proximal end and the radial projection of the elongated handle.

5. The barbecue grill of claim 4 wherein the keyhole includes a slot for receiving the radial projection, the slot oriented at an angle to the mating receiver in the retaining washer wherein upon insertion into the passageway the elongated handle is rotated to engage the radial projection with the mating receiver.

6. The barbecue grill of claim 4 wherein the second leg has a hole for receiving the end of the elongated handle, the hole having a different shape than the keyhole wherein the radial projection is restricted from being received into the hole.

7. The barbecue grill of claim 4 wherein the damper body comprises a first fastening end and a first free end extending at a first positioning angle therefrom, the fastening end having at least one opening wherein the first and second legs are adapted to pass through the at least one opening positioned above the aperture in the bottom of the barbecue grill.

8. The barbecue grill of claim 7 wherein one of the legs includes a boss for retaining the first fastening end upon the leg.

9. The barbecue grill of claim 7 wherein the at least one opening has a gripping surface adapted to be press fit around and frictionally secured to the first and second legs.

10. The barbecue grill of claim 9 wherein the at least one opening comprises a pair of slits adapted to receive the legs.

11. The barbecue grill of claim 10 further comprising a second damper body having a second fastening end and a second free end extending at a second positioning angle therefrom, the second positioning angle being different from the first positioning angle wherein said first and second free ends are spaced from each other, the first and second legs being adapted to pass through a second pair of slits positioned above the aperture in the bottom of the barbecue grill wherein the first and second damper bodies are maintained in sequential alignment on the hub assembly.

12. The barbecue grill of claim 11 further comprising a third damper body having a third fastening end and a third free end extending at a third positioning angle therefrom, the third positioning angle being different from the first positioning angle and second positioning angles wherein said first, second, and third free ends are spaced from each other, the first and second legs being adapted to pass through a third pair of slits positioned above the aperture in the bottom of the barbecue grill wherein the first, second, and third damper bodies are maintained in sequential alignment on the hub assembly.

13. The barbecue grill of claim 11 wherein one of the legs includes a boss adapted to retain the first, second, and third fastening ends upon the leg.

14. A barbecue grill comprising:
a grill housing having a bottom extending around a vertical axis and having an ash disposal opening positioned along the bottom, the bottom having an aperture aligned with the vertical axis;
damper means for covering the ash disposal opening, the damper means including a drive hub assembly rotatable about the vertical axis and having at least one damper body extending therefrom, the hub assembly being received into the aperture with an end portion of the hub assembly being positioned below the bottom, the end portion having an opening defining a passageway, the drive hub assembly having a retaining washer placed over the end portion and adjacent an outer wall of the bottom, the retaining washer having a mating receiver; and,
an elongated handle below the bottom having a proximal end and a distal end, the proximal end having a radial projection, the proximal end received in the passageway wherein the radial projection frictionally engages the mating receiver to secure the handle to the hub assembly without an additional fastening means.

15. The barbecue grill of claim 14 wherein the end portion of the hub assembly comprises first and second opposing legs, the passageway passing through the first leg and having a keyhole adapted for receiving the proximal end and the radial projection.

16. The barbecue grill of 15 wherein the keyhole includes a slot for receiving the radial projection, the slot oriented at an angle to the mating receiver in the retaining washer wherein upon insertion into the passageway the elongated handle is rotated to engage the radial projection with the mating receiver.

17. The barbecue grill of 15 wherein the second leg has a hole for receiving the end of the elongated handle, the hole having a different shape than the keyhole wherein the radial projection is restricted from being received into the hole.

18. The barbecue grill of 15 wherein the damper body comprises a first fastening end and a first free end extending at a first positioning angle therefrom, the first fastening end having at least one opening wherein the first and second legs are adapted to pass through the at least one opening positioned above the aperture in the bottom of the barbecue grill.

19. The barbecue grill of 18 wherein one of the legs includes a boss for retaining the first fastening end upon the leg.

20. The barbecue grill of 18 wherein the at least one opening has a gripping surface adapted to be press fit around and frictionally secured to the first and second legs.

21. The barbecue grill of 18 wherein the at least one opening comprises a pair of slits adapted to receive the legs.

22. The barbecue grill of claim 21 further comprising a second damper body having a second fastening end and a second free end extending at a second positioning angle therefrom, the second positioning angle being different from the first positioning angle wherein said first and second free ends are spaced from each other, the second fastening end having a second pair of slits, the first and second legs are adapted to pass through the second pair of slits positioned above the aperture in the bottom of the barbecue grill wherein the first and second damper bodies are maintained in sequential alignment on the hub assembly.

23. The barbecue grill of claim 22 further comprising a third damper body having a third fastening end and a third free end extending at a third positioning angle therefrom, the third positioning angle being different from the first positioning angle and second positioning angles wherein said first, second, and third free ends are spaced from each other, the third fastening end having a pair of third slits, the first and second legs are adapted to pass through the third pair of slits positioned above the aperture in the bottom of the barbecue grill wherein the first, second, and third damper bodies are maintained in sequential alignment on the hub assembly.

24. The barbecue grill of claim 23 wherein one of the legs includes a boss adapted to retain the first, second, and third fastening ends upon the leg.

25. A barbecue grill comprising:
a grill housing having a bottom and an ash disposal opening positioned along the bottom;
damper means for covering the ash disposal opening, the damper means including a drive hub assembly rotatable about a vertical axis of rotation and having at least one damper body extending therefrom, the bottom having an aperture aligned with the axis, the hub assembly being received into the aperture with an end portion of the hub assembly positioned below the bottom, the end portion having a first and second downwardly extending legs, the first and second legs having a linearly aligned passageway wherein the first leg has an entry keyhole, the hub assembly having a retaining washer, the retaining washer having a channel recess; and, an elongated handle below the bottom having a proximal end and a distal end, the proximal end being adapted to be received through the entry keyhole into the passageway wherein a radial projection of the proximal end is received by the channel recess to fixedly secure the elongated handle within the passageway.

26. The barbecue grill of claim 25 wherein the retaining washer is placed over the first and second legs and adjacent to an outer wall of the bottom.

27. The barbecue grill of claim 26 wherein the entry keyhole includes a slotted portion adapted for receiving the radial projection, the slotted portion positioned at an angle to the mating receiver wherein once passed though the entry keyhole and into the passageway, the radial projection is adapted to be rotated within the passageway to align the radial projection with the channel recess.

28. The barbecue grill of claim 27 wherein the second leg includes an exit opening adapted for receiving a portion of the proximal end of the elongated handle which is spaced from the radial projection, the exit opening having a different shape than the entry keyhole wherein the radial projection cannot enter the exit opening.

29. The barbecue grill of claim 25 wherein the damper body comprises a first fastening end and a first free end extending at a first positioning angle therefrom, the fastening end having a first pair of slits wherein the first and second legs are adapted to pass through the slits above the aperture in the bottom of the barbecue grill.

30. The barbecue grill of claim 29 further comprising a second damper body having a second fastening end and a second free end extending at a second positioning angle therefrom, wherein the first and second free ends are spaced from each other, the second fastening end having a second pair of slits, the first and second legs being adapted to pass through the second pair of slits prior to passing through the aperture in the bottom of the barbecue grill wherein the first and second damper bodies are maintained in sequential alignment on the hub assembly.

31. The barbecue grill of claim 30 further comprising a third damper body having a third fastening end and a third free end wherein the first, second, and third free ends are spaced from each other, the third fastening end having a third pair of slits, the first and second legs being adapted to pass through the third pair of slits prior to passing through the aperture in the bottom of the barbecue grill wherein the first, second, and third damper bodies are maintained in sequential alignment on the hub assembly.

32. The barbecue grill of claim 31 wherein one of the legs includes a boss for frictionally retaining the first, second, and third fastening ends upon the leg.

33. The barbecue grill of claim 31 wherein each of the first, second and third pairs of slits include a gripping surface wherein the first, second, and third pairs of slits are press fit around and frictionally secured to the first and second legs.

* * * * *